United States Patent
Appleyard et al.

(10) Patent No.: US 7,058,531 B2
(45) Date of Patent: Jun. 6, 2006

(54) TEMPERATURE COMPENSATION IN MAXIMUM FREQUENCY MEASUREMENT AND SPEED SORT

(75) Inventors: Jennifer E. Appleyard, Burlington, VT (US); Troy Carlson, Essex Junction, VT (US); Joseph M. Forbes, Westford, VT (US); Dean G. Percy, Stowe, VT (US); Norman J. Rohrer, Underhill, VT (US); William J. Tanona, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/708,916

(22) Filed: Mar. 31, 2004

(65) Prior Publication Data

US 2005/0222792 A1 Oct. 6, 2005

(51) Int. Cl.
*G01K 15/00* (2006.01)
(52) U.S. Cl. .......................................... 702/99; 331/25
(58) Field of Classification Search ................. 702/99, 702/108, 130, 132, 136, 117; 331/25, 111; 700/31; 327/512; 324/601; 326/71; 341/144; 374/43; 409/135
See application file for complete search history.

(56) References Cited

U.S. PATENT DOCUMENTS

| | | | |
|---|---|---|---|
| 4,179,740 A | 12/1979 | Malin | |
| 4,746,879 A | 5/1988 | Ma et al. | |
| 4,839,613 A | 6/1989 | Echols et al. | |
| 4,851,789 A | 7/1989 | Dobos | |
| 5,200,713 A | 4/1993 | Grace et al. | |
| 5,619,430 A | 4/1997 | Nolan et al. | |
| 5,629,612 A | 5/1997 | Schaffer | |
| 6,365,859 B1 | 4/2002 | Yi et al. | |
| 6,414,559 B1 | 7/2002 | Cole et al. | |
| 6,515,548 B1* | 2/2003 | Matsumoto et al. | 331/25 |
| 2002/0149434 A1 | 10/2002 | Toncich et al. | |
| 2003/0064694 A1 | 4/2003 | Oka et al. | |
| 2003/0184399 A1 | 10/2003 | Lanoue et al. | |
| 2003/0208286 A1* | 11/2003 | Abercrombie | 700/31 |

OTHER PUBLICATIONS

Dossier AUT919960070; Technique for Sorting High Frequency Integrated Circuits; S. Kundu Aug. 18, 1998.

* cited by examiner

*Primary Examiner*—Michael Nghiem
*Assistant Examiner*—Xiuqin Sun
(74) *Attorney, Agent, or Firm*—Scully, Scott, Murphy & Presser, P.C.; Anthony J. Canale, Esq.

(57) ABSTRACT

A method is disclosed of temperature compensation for measurement of a temperature sensitive parameter of semiconductor IC chips, particularly temperature compensation for a maximum frequency measurement (Fmax) and speed sort/categorization of semiconductor IC chips. The method includes determining a change of a temperature sensitive parameter of the chip with temperature; measuring the temperature sensitive parameter of the chip during testing of the chip; measuring the chip temperature directly during or following the measurement of the temperature sensitive parameter; and determining an adjusted temperature sensitive parameter of the chip based upon the measured temperature sensitive parameter of the chip during testing, the measured chip temperature, and the determined change of the temperature sensitive parameter of the chip with temperature.

18 Claims, 1 Drawing Sheet

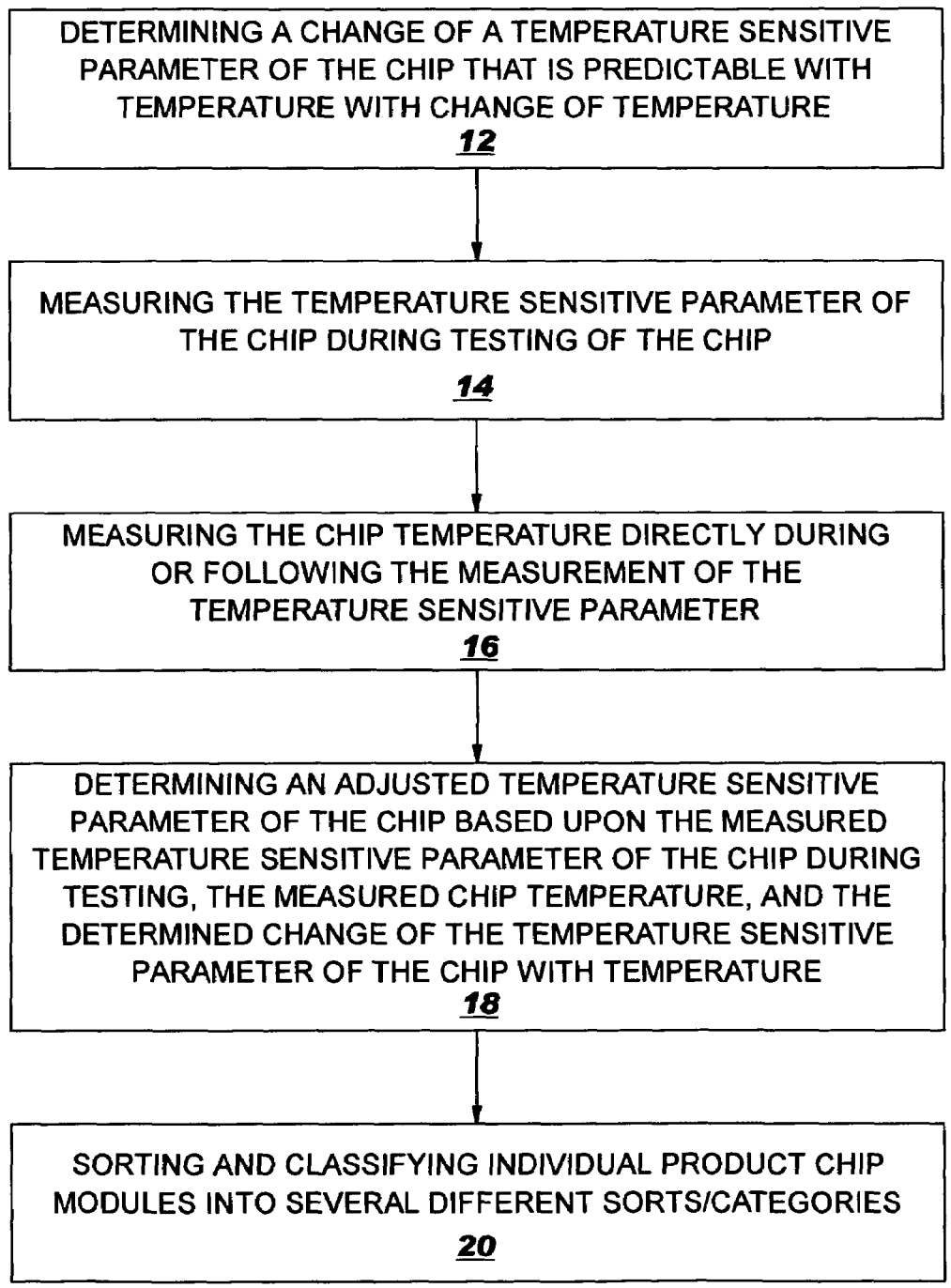

TEMPERATURE COMPENSATION IN MAXIMUM FREQUENCY MEASUREMENT AND SPEED SORT

BACKGROUND OF INVENTION

The present invention relates generally to a method for providing temperature compensation for measurement of a temperature sensitive parameter of semiconductor IC (integrated circuit) chips, and more particularly pertains to providing temperature compensation for a maximum frequency measurement (Fmax) and speed sort/categorization of semiconductor IC chips such as micro-processors.

During testing of a high-power 130 nm microprocessor product, the operational speeds of the microprocessor chip modules are measured, and the individual product chip modules are sorted and classified into several different sorts/categories, typically three sorts reflecting fast, medium and slow operating speed chips.

The microprocessor chip modules are water-cooled during the test measurements using a handler, which supports and cools the individual products during testing. At points during the test, the chip temperature (Tdtest) is frequently higher than the setpoint temperature of the handler. For some measurements and on a significant population of hardware tested, the chip temperature is higher than the customer's planned maximum operating temperature (Tmax). During pre-production tests, chips are at temperatures as high as 100 C (35 C above Tmax), and during production/manufacturing speed-sort tests, chips are often at temperatures as high as 80 C (15 C above Tmax). This temperature rise reduces the maximum operating speed (Fmax in gigahertz) of the part during test by as much as 3% for 15 C above Tmax. As a consequence, parts are measured and categorized/binned as slower than they would actually perform in the customer application environment at temperatures at or below Tmax.

SUMMARY OF INVENTION

The present invention provides a method of temperature compensation for measurement of a temperature sensitive parameter of semiconductor IC chips, particularly temperature compensation for a maximum frequency measurement (Fmax) and speed sort/categorization of semiconductor IC chips such as microprocessors.

The method involves determining the relationship of a temperature sensitive parameter of the chip to temperature prior to manufacturing/production test. Then during manufacturing/production test, measuring the temperature sensitive parameter of the chip; measuring the chip temperature directly during or following the measurement of the temperature sensitive parameter; determining an adjusted temperature sensitive parameter of the chip based upon the measured temperature sensitive parameter of the chip during testing, the measured chip temperature, and the determined change of the temperature sensitive parameter of the chip with temperature; and sorting the chip into specific speed categories based upon the adjusted temperature sensitive parameter.

BRIEF DESCRIPTION OF DRAWINGS

The foregoing objects and advantages of the present invention for temperature compensation in maximum frequency measurement and speed sort may be more readily understood by one skilled in the art with reference being had to the following detailed description of several embodiments thereof, taken in conjunction with the accompanying drawings wherein FIG. 1 is a process flow diagram of a process pursuant to the present invention for providing temperature compensation for a temperature sensitive parameter of an IC chip with a change of temperature.

DETAILED DESCRIPTION

The present invention uses an on-chip diode to measure temperature directly during or after the measurement of the maximum operating speed (Fmax in gigahertz) during pre-production stages or during production test on the chip. Generally, the temperature measurements are always taken during the Fmax or power readings, and in reality they are taken after, in milliseconds. However, tests have indicated that measurements taken during and substantially immediately after are effectively the same. Accordingly, the description herein is of temperature measurements taken during or after the measurement of the maximum operating speed Fmax or power readings.

The on-chip temperature measurement is taken by the on-chip diode in the disclosed embodiment because the on-chip diode is already present on the chip. In alternative embodiments, the on-chip temperature measurement could be taken by any suitable temperature responsive or sensitive component such as a temperature sensitive resistor or other temperature sensitive component.

Pursuant to the present invention, all parts registering a diode measured temperature during the test (Tdtest)that is higher or lower than the customer's planned maximum temperature (Tmax) have the Fmax measured at Tdtest adjusted upwardly or downwardly to arrive at a more realistic Fmax at Tmax based upon the results of product temperature and speed characterization data. The adjusted Fmax more realistically reflects a part's true Fmax at Tmax. This adjusted Fmax has been compared and correlated to Fmax measured on a system bring-up platform and in the customer application environment with positive, accurate results. The manufacturing test program has been optimized to adjust Fmax while minimizing test time impact and maximizing appropriate sorting for fast parts.

The product chip has an on-chip diode that is used to measure temperature by forcing a current through the diode and measuring a voltage at the start of the Fmax test, when (Tdtest) is known, and again after the Fmax test when (Tdtest) is unknown. The change in diode voltage per change in temperature has been extensively measured and is predictable so as to characterized, so that a temperature change can be calculated from the diode voltages. The change in Fmax per change in Tdtest has also been extensively measured and is predictable so as to characterized also. If the temperature rise shows that (Tdtest) is above or below Tmax, a predicted Fmax at Tmaxis calculated, based upon which the part is sorted into speed categories.

The present invention uses a diode on chip to measure temperature using the following steps:

force a 100 uA current and measure voltage;

initially determine the characteristic diode voltage change per degree (slope);

calibrate diode, force a current and measure voltage at a known temperature ($V_{diode0}$, T0);

force a current and measure voltage at an unknown temperature ($V_{diode1}$, $T_1$); and calculate $T_1 = (V_{diode1} - V_{diode0}) * slope + T_0$.

The temperature of a part such as the high-power 130 nm microprocessor is controlled by a liquid cooled handler during test. Historically on previous products, the junction temperature of the die is up to 5 C above the temperature of the handler. On this microprocessor product, the junction temperature of the die is 15 C or more above the temperature of the handler.

The temperature rise is significant during the Fmax measurement. The amount of temperature rise varies per part and is not highly predictable. On this microprocessor, the frequency decreases, with a 1.7% frequency degrade per 10 C rise. Fmax as measured is lower than the part's "true" Fmax because of the elevated temperature during test. The present invention calculates Fmax while accounting for temperature rise during test $F_{adjusted} = F_{meas} + df/dt(T_{max} - T_{meas})$.

Measuring Fmax and Tmax and determining a predicted Fmax for all products with Tdtest> or < Tmax in this manner was performed on a number of parts, and the predicted Fmax were highly correlated and accurate with respect to Fmax measured exactly at Tmax, on both a bring-up platform and in the end customer application.

The method of the present invention has applications in addition to the determination of Fmax from measurements made during test, and could be used to determine other temperature sensitive parameters that are predictable with temperature, such as I (input)/O (output) timings and maximum and minimum voltage tests, which measure the highest and lowest possible voltages at which a product will operate, and any other suitable temperature sensitive parameter that is predictable with temperature.

The method of the present invention has applications in both pre-production stages and in production tests.

In pre-production stages, when speed tests are extensive and cause large temperature rises, this method allows for a realistic indication of speed at Tmax for performance modeling purposes which predict the speed of parts, and the percentages of good/operative parts sorted into speed categories.

Also in pre-production tests, the method of the present invention provides for system correlation where the adjusted Fmax at test is compared to a system/bring-up platform.

In production tests, the method of the present invention allows for an enriched performance sort yield, or a larger percentage of hardware falling into the fastest speed sorts/categories. On a sampling in the high-power 130 nm microprocessor product, performance sort yield has been enriched by from 32% to 45% using a manufacturing test that accommodates temperature compensation in Fmax measurement and speed sorting, and is optimized for minimal test time impact.

The method of the present invention allows the use of handler equipment that does not tightly control the temperature of the parts, for example the use of relatively inexpensive air controlled/cooled handler equipment, as opposed to more expensive liquid controlled/cooled handler equipment.

FIG. 1 is a process flow diagram of a process pursuant to the present invention for providing temperature compensation for a temperature sensitive parameter of an IC chip with a change of temperature. The method comprises, prior to manufacturing, at 12 determining a change of a temperature sensitive parameter of the chip (that is predictable with temperature) with change of temperature. Then, during manufacturing, at 14 measuring the temperature sensitive parameter of the chip during testing, at 16 measuring the chip temperature directly during or following the measurement of the temperature sensitive parameter, at 18 determining an adjusted temperature sensitive parameter of the chip based upon the measured temperature sensitive parameter of the chip during testing, the measured chip temperature, and the determined change of the temperature sensitive parameter of the chip with temperature, and at 20 sorting and classifying individual product chip modules into several different sorts/categories, typically three sorts reflecting fast, medium and slow operating speed chips.

While several embodiments and variations of the present invention for a temperature compensation in maximum frequency measurement and speed sort are described in detail herein, it should be apparent that the disclosure and teachings of the present invention will suggest many alternative designs to those skilled in the art.

We claim:

1. A method of testing and measuring an IC (integrated circuit) chip, comprising:
   prior to manufacturing, determining a change of a temperature sensitive parameter of the chip, that is predictable with change of temperature;
   during manufacturing, measuring the temperature sensitive parameter of the chip during testing of the chip,
   measuring the chip temperature during or following the measurement of the temperature sensitive parameter,
   determining an adjusted temperature sensitive parameter of the chip based upon the measured temperature sensitive parameter of the chip during testing, the measured chip temperature, and the determined change of the temperature sensitive parameter of the chip with temperature; and
   testing the chip in preproduction tests to provide a realistic indication of speed at Tmax for performance modeling purposes to predict the speed of chips and the percentages of good/operative chips sorted into speed categories.

2. The method of claim 1, further including sorting the chip into a category based upon the adjusted temperature sensitive parameter of the chip.

3. The method of claim 1, further including determining a change of the temperature sensitive parameter of the chip that is the chip maximum operating frequency Fmax.

4. The method of claim 3, further including measuring the chip temperature with an on-chip diode.

5. The method of claim 4, further including measuring the chip temperature with the on-chip diode by forcing a current through the on-chip diode, measuring the diode voltage at the start of test when the temperature during test Tdtest is known, and measuring the diode voltage again after the Fmax test when the temperature Tdtest is unknown, and using the measurements to determine predicted Fmax at Tmax, based upon which the part is sorted into speed categories.

6. The method of claim 1, further including determining a change of the temperature sensitive parameter of the chip that is the chip power consumption.

7. The method of claim 1, further including determining a change of the temperature sensitive parameter of the chip that is the chip I (input)/O (output) timings.

8. The method of claim 1, further including determining maximum and minimum voltage tests which measure the highest and lowest possible voltages at which a product will operate.

9. The method of claim 1, further including testing the chip in production tests to classify each chip into different categories of the temperature sensitive parameter.

10. A method of testing and measuring an IC (integrated circuit) chip, comprising:
    determining a change of a temperature sensitive parameter of the chip, that is predictable with change of temperature, with temperature;

measuring the temperature sensitive parameter of the chip during testing of the chip, measuring the chip temperature during or following the measurement of the temperature sensitive parameter, determining an adjusted temperature sensitive parameter of the chip based upon the measured temperature sensitive parameter of the chip during testing, the measured chip temperature, and the determined change of the temperature sensitive parameter of the chip with temperature; and testing the chip in preproduction tests to provide a realistic indication of speed at Tmax for performance modeling purposes to predict the speed of chips and the percentages of good/operative chips sorted into speed categories.

11. The method of claim 10, further including sorting the chip into a category based upon the adjusted temperature sensitive parameter of the chip.

12. The method of claim 10, further including determining a change of the temperature sensitive parameter of the chip that is the chip maximum operating frequency Fmax.

13. The method of claim 12, further including measuring the chip temperature with an on-chip diode.

14. The method of claim 13, further including measuring the chip temperature with the on-chip diode by forcing a current through the on-chip diode, measuring the diode voltage at the start of test when the temperature during test Tdtest is known, and measuring the diode voltage again after the Fmax test when the temperature Tdtest is unknown, and using the measurements to determine predicted Fmax at Tmax, based upon which the part is sorted into speed categories.

15. The method of claim 10, further including determining a change of the temperature sensitive parameter of the chip that is the chip power consumption.

16. The method of claim 10, further including determining a change of the temperature sensitive parameter of the chip that is the chip I (input)/O (output) timings.

17. The method of claim 10, further including determining maximum and minimum voltage tests which measure the highest and lowest possible voltages at which a product will operate.

18. The method of claim 10, further including testing the chip in preproduction tests to classify each chip into different categories of the temperature sensitive parameter.

* * * * *